W. A. LINQUIST.
AUTOMATIC FENDER FOR AUTOMOBILES.
APPLICATION FILED NOV. 3, 1910.

1,009,158.

Patented Nov. 21, 1911.

3 SHEETS—SHEET 1.

Witnesses,
E. C. Skinkle
Harry Opsahl.

Inventor,
Wm. A. Linquist
By his Attorneys,
Williamson & Merchant

W. A. LINQUIST.
AUTOMATIC FENDER FOR AUTOMOBILES.
APPLICATION FILED NOV. 3, 1910.
1,009,158.
Patented Nov. 21, 1911
3 SHEETS—SHEET 3.
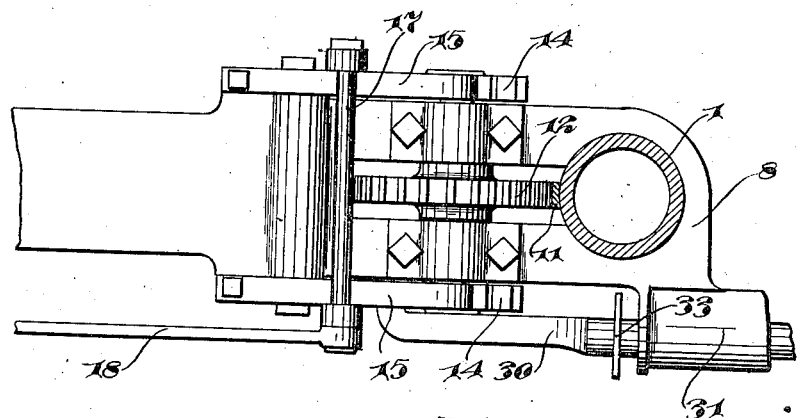
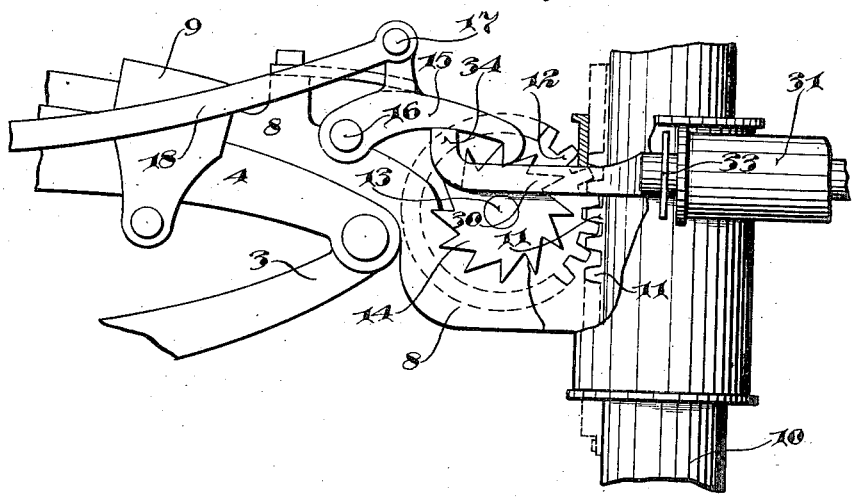

UNITED STATES PATENT OFFICE.

WILLIAM A. LINQUIST, OF MINNEAPOLIS, MINNESOTA.

AUTOMATIC FENDER FOR AUTOMOBILES.

1,009,158. Specification of Letters Patent. Patented Nov. 21, 1911.

Application filed November 3, 1910. Serial No. 590,462.

*To all whom it may concern:*

Be it known that I, WILLIAM A. LINQUIST, a citizen of the United States, residing at Minneapolis, in the county of Hennepin and State of Minnesota, have invented certain new and useful Improvements in Automatic Fenders for Automobiles; and I do hereby declare the following to be a full, clear, and exact description of the invention, such as will enable others skilled in the art to which it appertains to make and use the same.

My invention is directed to the provision of an improved automatic fender for automobiles, but the fender is capable of general use in connection with motor-propelled vehicles.

Generally stated, the invention consists of the novel devices and combinations of devices hereinafter described and defined in the claims.

In the accompanying drawings, which illustrate the invention, like characters indicate like parts throughout the several views.

Figure 1:
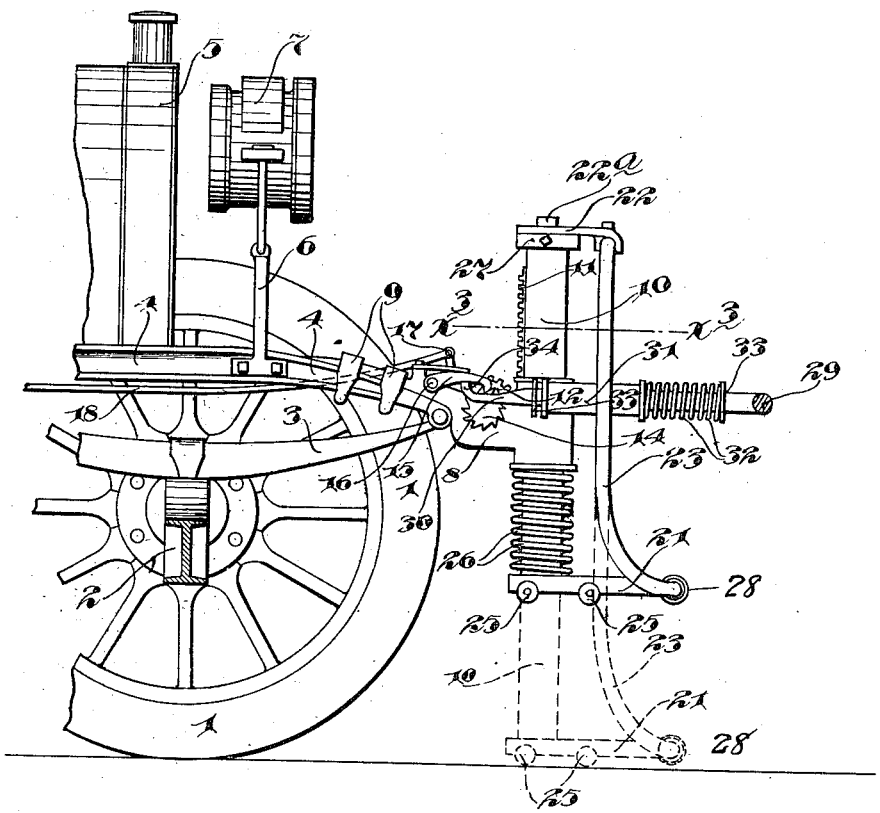
Figure 2:
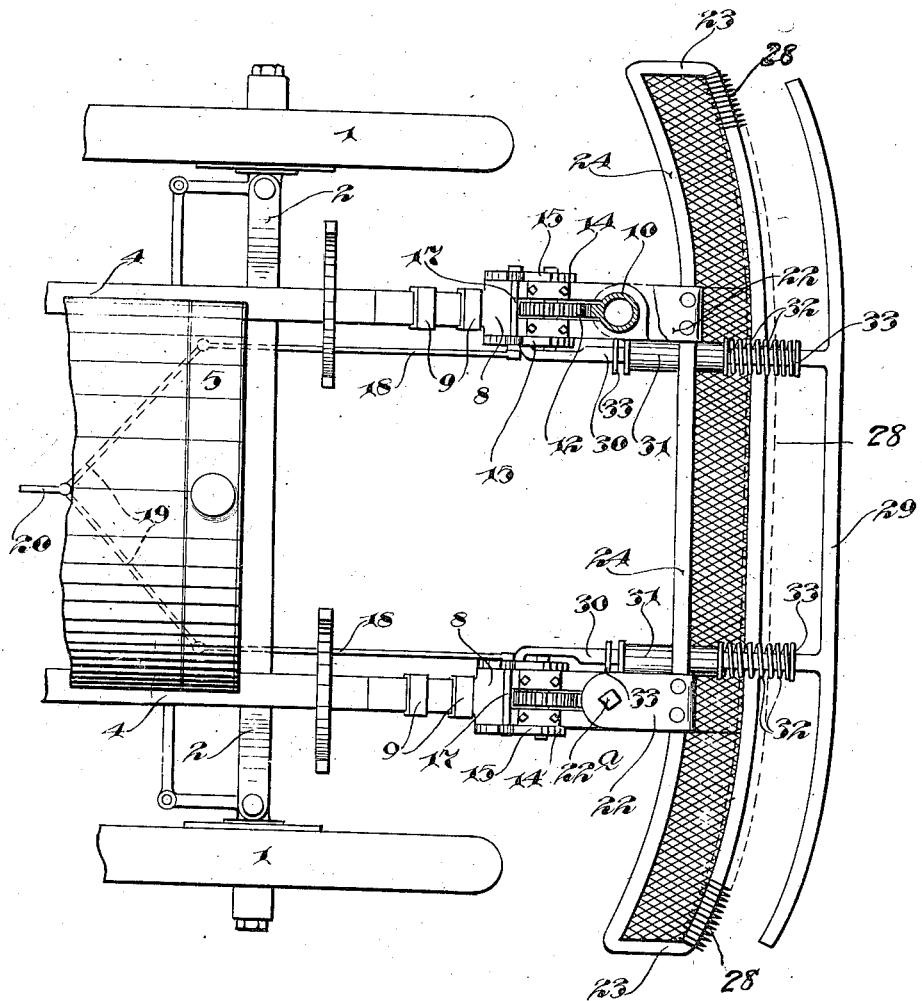

Referring to the drawings, Figure 1 is a side elevation, showing the front portion of an automobile and showing my improved automatic fender applied thereto, some parts being broken away and some parts being sectioned; Fig. 2 is a plan view of the parts shown in Fig. 1, some parts being sectioned; Fig. 3 is an enlarged detail in horizontal section, on the line $x^3$ $x^3$ of Fig. 1; and Fig. 4 is a side elevation of the parts shown in Fig. 3, some parts being sectioned and some parts being broken away.

Of the parts of the automobile, the numeral 1 indicates the front wheels, the numeral 2 the front axle, the numeral 3 the front springs, the numeral 4 the frame bars (which are pivotally connected at their front ends to the front ends of the springs 3), the numeral 5 the radiator jacket, and the numeral 6 the lamp brackets which, as shown in Fig. 1, support lamps 7. The automobile may be of standard or any construction and, of course, constitutes no part of my invention.

The automatic fender may be attached to the automobile in different ways, but may be conveniently attached as shown in the drawings, by means of strong bearing brackets 8 secured to the front ends of the frame bars 4 by clamps 9. The projecting front ends of the bearing brackets 8 are formed with vertical seats through which plunger bars 10 are adapted to work vertically. These plunger bars may take various forms, but are preferably made tubular and provided on their rear faces with rack bars 11 that mesh with spur gears 12 secured to short shafts 13 mounted in the bifurcated front end portions of the bearing brackets 8. The gear shafts 13 are provided with ratchet wheels 14 which, as shown, are applied to the said shafts in pairs. Each pair of ratchet wheels 14 is engaged by a pair of retaining pawls 15 secured to small rock shafts 16 mounted in the bearing brackets 8 at the rear of their bifurcated portions. The pairs of retaining pawls 15 thus connected to the shafts 16 are, of course, arranged to be simultaneously engaged and simultaneously disengaged with their coöperating ratchet wheels 14 and, as shown, the said pawls are further connected in pairs by transverse tie rods 17 to the outer ends of which releasing rods 18 are attached. The rear ends of the releasing rods 18 are shown as connected by links 19 (see Fig. 2) to a common releasing rod 20, which latter extends to a point where it may be engaged and operated by the driver of the automobile. The purpose of these releasing connections for the retaining pawls will be made clear later on.

The plunger bars 10, above noted, constitute vertically movable elements of the automatic fender, and to the lower ends thereof, are rigidly secured forwardly projecting tie bars 21, while to the upper ends of said plungers are rigidly secured upper tie bars 22. The said tie bars 22 are preferably detachably secured to said plungers by machine screws 22ª. The lower tie bars 21 project forward farther than the upper tie bars 22 and the said upper and lower tie bars serve to support, in an approximately upright position, an approximately rectangular marginal frame 23, preferably made from metal tubing. This frame 23 supports a strong flexible network 24 which, in case of an accident, is adapted to catch a person run down by the machine. For direct engagement with the ground, the lower tie bars 21 are preferably provided with small wheels 25. Heavy coiled springs 26 are applied around the plunger bars 10 and compressed between the tie bars 21 and the bearing brackets 8 and tend to throw the fender downward from its normal or raised position, shown by full lines in Fig. 1, into its lowered position shown by dotted lines. The said fender is normally held in its raised position shown, by the engagement of the retaining pawls 15 with the ratchet wheels 14; and, as is evident, by these pawl and ratchet devices, the said fender may be normally set at any desired elevation above the ground, regardless of the diameter of the wheels of the automobile. When it is released by raising of the pawls 15, the springs 26 will instantly throw the same downward until the wheels 25 strike the ground.

To prevent the lower portion of the fender from being thrown into a deep depression in the road bed, such as would be liable to catch the fender and break the same, stop devices are applied to the upper ends of the plunger bars 10 for engagement with the upper portions of the bearing brackets 8. These stop devices may take different forms, but they are preferably in the form of washers 27 secured on the upper ends of said plunger bars 10 by set screws or other suitable means. To thus adjust the device to machines having wheels of different diameters or having their frame bars at different elevations, washers 27 of different thickness, or several of the said washers, may be applied to the said plunger bars.

The lower transverse bar of the fender frame 23 is preferably incased in the coiled spring 28 which serves as a cushion tending to prevent persons struck thereby from being severely hurt and which, furthermore, is engageable with the ground or road bed and prevents the bar from being caught by irregularities in the road bed.

By means of the connections 18, 19 and 20 described, the pawls 15 may be simultaneously released from the ratchet wheels 14 so as to cause the fender to drop to its lowered position at will. This manually operated means for releasing the fender will be serviceable only when the operator observes a person in a dangerous position in front of the machine in time to drop the fender. As a highly important feature of the invention, however, I provide an automatic trip for releasing the fender and which projects in front of the fender so that the fender will be released and dropped to its lowered position automatically whenever a person in front of the machine is about to be struck by the machine. This automatic tripping device is preferably in the form of a transversely extended tripping bar 29 having rearwardly extended plunger-like arms 30 that work telescopically through bearing sleeves 31 on the bearing brackets 8. Coiled springs 32 on the front portions of the arms 30 re-act against collars 33 on the said arms and against the front ends of the bearing sleeves 31 and yieldingly hold the tripping bar 29 in its forwardly projected position shown in the drawings. The rear ends of the arms 30 are provided with upwardly extended tripping fingers 34 which lie directly under the outer retaining pawls 15 and normally permit the said pawls to engage the coöperating ratchet wheels 14.

When the tripping bar 29 is struck by a person in front of the fender, it will be forced rearwardly and the tripping fingers 34, with a cam-like action on the retaining pawls 15, will raise the same into in-operative positions or out of engagement with the teeth of the ratchet wheels 14 and thus the fender will be automatically released and instantly thrown downward to its operative position on the ground. In this way, the fender is thrown to its lowered position before it can possibly be engaged by a person in front of the machine.

A person struck by the tripping bar 29, will probably be knocked down upon the ground, but he cannot be run over by the machine. On the contrary, he will be caught or engaged by the lowered fender and will be carried by the said fender or thrown to one side of the machine. The fender, therefore, saves the person struck from severe shocks and very greatly removes the danger of serious accidents by positively preventing the person from being run over by the machine.

To re-set the fender in its raised or normal position, it is only necessary to lift or force the same upward the desired distance above the ground and it will be held in such position by the automatic engagement of the retaining pawls 34 with the ratchet wheels 14. In the drawings, two ratchet wheels and two retaining pawls are shown as arranged for coöperation with each plunger bar 10, but one ratchet wheel and one retaining pawl for each plunger will be sufficient.

This improved fender may be easily attached to all standard forms of automobiles and, as shown in the drawings, is especially designed for application on automobiles. It may, however, be readily applied to all forms of motor-propelled vehicles and may be easily applied to street cars, in which latter suggested application it will be found highly useful.

What I claim is:

1. A fender attachment comprising fender supports, a fender attached to said supports and vertically movable as an entirety in respect thereto, means for holding said fender in several different raised positions, and an automatic tripping device for releasing the said fender, substantially as described.

2. A fender attachment comprising fender supports, a fender connected to said supports with freedom for vertical movements as an entirety, means for securing said fender in several different raised positions, a spring pressed automatically actuated fender tripping bar projecting in front of said fender and having connections for releasing the said fender securing means, substantially as described.

3. A fender attachment comprising fender supports adapted to be attached to a vehicle, downwardly spring-pressed plunger bars movable vertically in said supports, a fender frame carried by said plunger bars, rack teeth on said plunger bars, gears meshing with said racks, pawl and ratchet devices coöperating with said gears to normally hold said plunger bars in up-lifted positions, and a forwardly spring-pressed tripping bar normally projected in front of said fender frame and provided with rearwardly extended arms guided by the said fender supports and operated to release the said pawl and ratchet devices when said tripping bar is pressed rearward.

4. A fender attachment comprising fender supports adapted to be attached to a vehicle, downwardly spring-pressed plunger bars movable vertically in said supports, a fender frame carried by said plunger bars, rack teeth on said plunger bars, gears meshing with said racks, pawl and ratchet devices coöperating with said gears to normally hold said plunger bars in up-lifted positions, a forwardly spring-pressed tripping bar normally projected in front of said fender frame and provided with rearwardly extended arms guided by the said fender supports and operative to release the said pawl and ratchet devices, when said tripping bar is pressed rearward, and manually operated ratchet tripping devices operative at will, substantially as described.

5. The combination with a vehicle, of a fender attachment comprising fender supports applied to the front portion of the vehicle, plunger bars working vertically through said supports, a fender frame carried by said plunger bars, racks on said plunger bars, gears engaging said racks, ratchet wheels connected to said gears, retaining pawls coöperating with said ratchet wheels to hold said fender frame in a raised position, a tripping bar positioned in front of said fender and having rearwardly extended arms mounted in said bearings and operative when moved rearward to release said pawls from said ratchet wheels, springs yieldingly pressing said tripping bar forward, and springs yieldingly pressing said fender frame downward, substantially as described.

6. The combination with an automobile having frame bars projecting forward in front of its front wheels, of fender supports applied to the front ends of said frame bars, plunger bars working vertically through said supports, a fender frame carried by said plunger bars, a lock for securing said plunger bars and fender frame in up-lifted positions, and a trip for said lock having a forwardly spring-pressed tripping bar located in front of said fender frame, substantially as described.

In testimony whereof I affix my signature in presence of two witnesses.

WILLIAM A. LINQUIST.

Witnesses:
ALICE V. SWANSON,
FRANK D. MERCHANT.